(12) United States Patent
Mann

(10) Patent No.: US 11,606,185 B2
(45) Date of Patent: Mar. 14, 2023

(54) DETECTION OF PHYSICAL LAYER PARAMETER OF A MASTER DEVICE IN AN ETHERNET NETWORK

(71) Applicant: Marvell Asia Pte, Ltd., Singapore (SG)

(72) Inventor: Jessica Lauren Mann, Pepper Pike, OH (US)

(73) Assignee: Marvell Asia Pte Ltd, Singapore (SG)

( * ) Notice: Subject to any disclaimer, the term of this patent is extended or adjusted under 35 U.S.C. 154(b) by 99 days.

(21) Appl. No.: 17/096,784

(22) Filed: Nov. 12, 2020

(65) Prior Publication Data

US 2021/0143972 A1 May 13, 2021

Related U.S. Application Data

(60) Provisional application No. 62/934,442, filed on Nov. 12, 2019.

(51) Int. Cl.
*H04L 7/00* (2006.01)
*H04L 69/323* (2022.01)

(52) U.S. Cl.
CPC .......... *H04L 7/0016* (2013.01); *H04L 69/323* (2013.01)

(58) Field of Classification Search
CPC . H04L 7/0016; H04L 69/323; H04L 27/2613; H04L 27/2603; H04L 5/0053
See application file for complete search history.

(56) References Cited

U.S. PATENT DOCUMENTS

| 9,979,507 | B1* | 5/2018 | Lo ............................. H04L 7/04 |
| 9,998,950 | B2* | 6/2018 | Zhang ................. H04L 27/2603 |
| 10,079,709 | B2* | 9/2018 | Sun ..................... H04L 27/2646 |
| 2003/0002108 | A1 | 1/2003 | Ames et al. |
| 2009/0154473 | A1 | 6/2009 | Diab et al. |
| 2017/0063700 | A1 | 3/2017 | Wang et al. |

FOREIGN PATENT DOCUMENTS

WO WO-2016/126175 A1 8/2016

OTHER PUBLICATIONS

International Search Report and Written Opinion in International Patent Application No. PCT/US2020/060293, dated Mar. 9, 2021 (16 pages).

(Continued)

*Primary Examiner* — Chandrahas B Patel

(57) ABSTRACT

In a method for establishing a communication link between a first network interface device and a second network interface device comprises, the second network interface device receives a training signal transmitted by the first network interface device. The training signal is for timing synchronization between the second network interface device and the first network interface device. The second network interface device determines, based on at least one physical characteristic of the training signal, a physical layer (PHY) parameter of the first network interface device. A controller of the second network interface device configures one or more components of the second network interface device to operate in a mode that corresponds to the determined PHY operating parameter of the first network interface device.

22 Claims, 7 Drawing Sheets

(56) References Cited

OTHER PUBLICATIONS

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Std. 802.3bp™-2016, "IEEE Standard for Ethernet—Amendment 4: Physical Layer Specifications and Management Parameters for 1Gb/s Operation over a Single Twisted Pair Copper Cable," *The Institute of Electrical and Electronics Engineers, Inc.*, 211 pages (Jun. 30, 2016).

\* cited by examiner

DETECTION OF PHYSICAL LAYER PARAMETER OF A MASTER DEVICE IN AN ETHERNET NETWORK

CROSS REFERENCES TO RELATED APPLICATIONS

This application claims the benefit of U.S. Provisional Patent Application No. 62/934,442, entitled "Rapid Detection of 100 or 1000 BASE-T1 on Slave Side," filed on Nov. 12, 2019, which is hereby incorporated herein by reference in its entirety.

FIELD OF TECHNOLOGY

The present disclosure relates generally to Ethernet communication systems, and more particularly to automatic detection of physical layer parameters during link establishment between network devices in an Ethernet communication system.

BACKGROUND

Modern vehicles, such as advanced automobiles, have begun using automotive Ethernet technologies to connect components over a wired physical network within the vehicle. One important requirement for an automotive Ethernet network is start-up time of the components of the Ethernet network. Typically, vehicle network components are required to be linked-up and operational within a certain period of time after start-up of the vehicle, for example within a few hundred milliseconds after start-up of the vehicle, to allow the vehicle to be fully operational within a certain time, such as within no more than two seconds, after start-up of the vehicle. In order to meet such stringent time constraints, automotive Ethernet networks eliminate some processes that are used in typical non-automotive Ethernet applications, for example processes that perform auto-negotiation of physical layer (PHY) operating parameters between various components of the network.

Auto-negotiation used in non-automotive Ethernet application is a standardized process of exchanging information regarding capabilities of devices on a network. Such auto-negotiation process is defined, for example, in clause 28 of IEEE 802.3 Standard. Auto-negotiation generally involves transmission of auto-negotiation signals between network devices, where the auto-negotiation signals indicate (e.g., encode) capabilities of the network devices, or parameters supported by the network devices. For example, an auto-negotiation signal transmitted by a particular network device indicates a plurality of PHY operating parameters, or PHY operating modes, that are supported by the particular network device, such as a plurality of transmission speeds supported by the particular network device. Based on an exchange of such auto-negotiation signals between network devices, the network devices may select PHY operating parameters mutually supported by the network devices. For example, two network devices may select a highest transmission speed that is supported by both network devices. The selections made by auto-negotiation may then be used to dynamically configure the network devices for operation with the selected mutually supported operating parameters of the network devices. The auto-negotiation process, thus, allows for easy integration of devices that support operation with multiple PHY operating parameters in a network. The auto-negotiation process, however, may add significant amount of time to establishing links between devices on the network.

Instead of using auto-negotiation to select PHY operating parameters, in the current start-up time sensitive automotive Ethernet applications, network components typically are pre-configured at the time of vehicle manufacture so that the network components start up with pre-configured PHY operating parameters, or in pre-configured PHY operating modes. The need to pre-configure network components is a limitation in many vehicle manufacturing operations. For example, if a particular network component is capable of operating with one of several PHY operating parameters, such as one of several transmission speeds (e.g., 100 Mbits/s in accordance with the 100 Base-T1 Standard, 1000 Mbits/s in accordance with the 1000 Base-T1 Standard, 10 Mbits/s in accordance with the 10 Base-T1L/S Standards, multi-gigabit per second speed in accordance with a multi-gigabit Standard, etc.), the network component needs to be differently configured for operation in different vehicles, such as higher-end, luxury, vehicles verses lower-end, non-luxury, vehicles. The requirement to differently pre-configure a network component for placement of the component into different types vehicles, so that the network component operates with different PHY operating parameters in the different types of vehicle, may decrease manufacturing efficiency and increase manufacturing costs.

SUMMARY

In an embodiment, a method for establishing a communication link between a first network interface device and a second network interface device comprises: receiving, at the second network interface device, a training signal transmitted by the first network interface device, the training signal being for timing synchronization between the second network interface device and the first network interface device; determining, with the second network interface device based on at least one physical characteristic of the training signal, a physical layer (PHY) parameter of the first network interface device; and configuring, with a controller of the second network interface device, one or more components of the second network interface device to operate in a mode that corresponds to the determined PHY operating parameter of the first network interface device.

In another embodiment, an apparatus comprises a second network interface device for coupling the apparatus with a first network interface device via a network link. The second network interface device comprises: a transceiver, implemented on one or more integrated circuit (IC) devices, configured to receive a training signal transmitted by the first network interface device over the network link, the training signal being for timing synchronization of the second network interface device with the first network interface device; a physical layer (PHY) operating parameter detector, implemented on the one or more IC devices, configured to determine, based on at least one physical characteristic of the training signal, a PHY operating parameter of the first network interface device; and a controller, implemented on the one or more IC devices, configured to configure one or more components of the second network interface device to operate in a mode that corresponds to the determined PHY operating parameter of the first network interface device.

DETAILED DESCRIPTION

Figure 1:
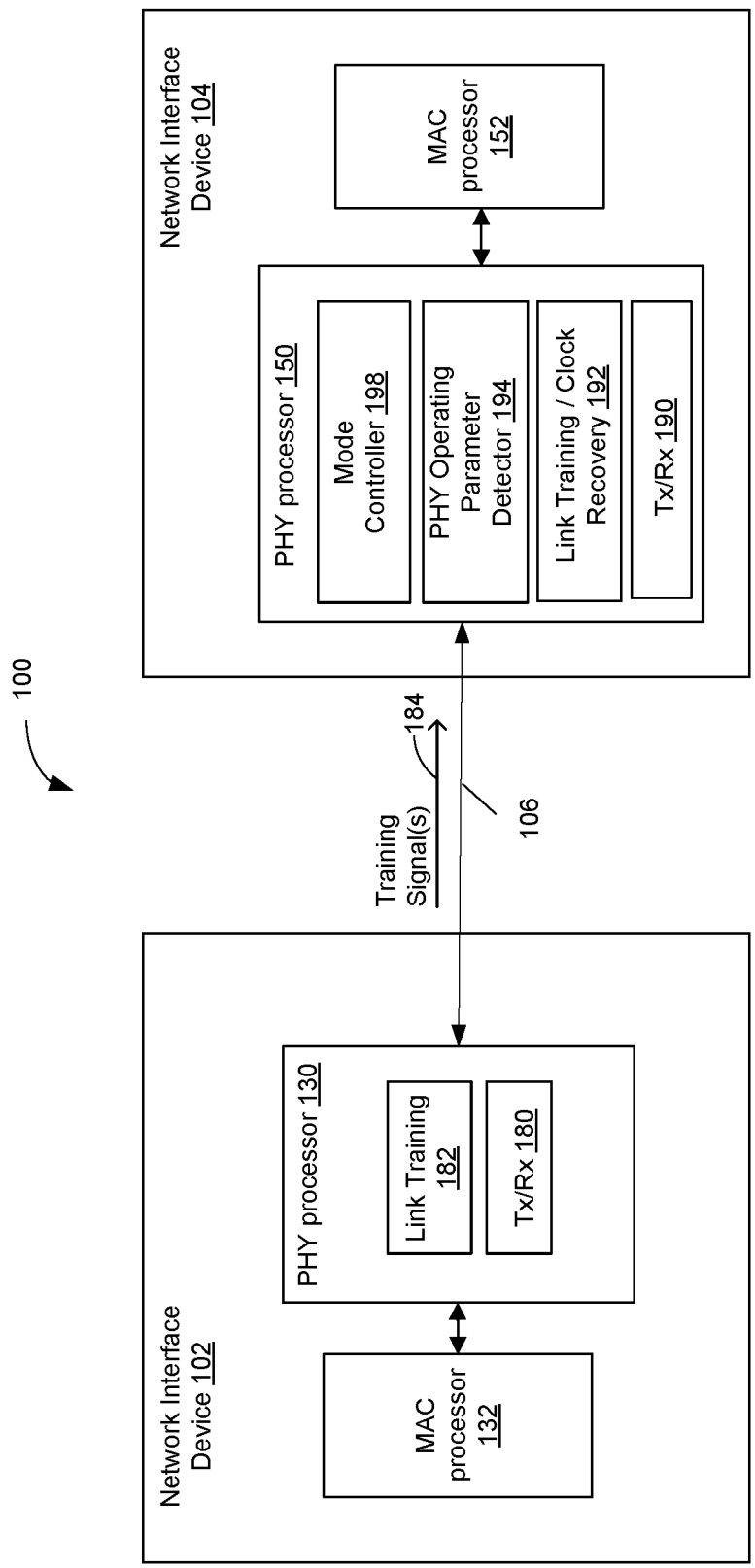
FIG. 1 is a block diagram of an example system in which a slave device is configured to detect at least one PHY operating parameter of a master device during a training phase of link establishment between the master device and the slave device, according to an embodiment.

In embodiments described below, link establishment between a first network device (e.g., a master device) and a second network device (e.g., a slave device) in an Ethernet network includes automatically detecting, at the slave device, at least one PHY operating parameter (e.g., a transmission speed), or a PHY operating mode, of the master device during a training phase of link establishment between the master device and the slave device. In an embodiment, the slave device is configured to detect a PHY operating parameter (or the PHY operating mode) of the master device based on one or more physical characteristics of one or more training signals received during the training phase of link establishment between the master device and the slave device, where the one or more physical characteristics of the one or more training signals depend on the PHY operating parameter (or the PHY operating mode) of the master device. For example, the slave device is configured to detect, based on the one or more physical characteristics of the one or more training signals received from the master device, whether the master device is operating with i) a first transmission speed, such as 100 Mbits/s transmission speed, for example in accordance the 100 Base-T1 Standard specified by IEEE 802.3bw (also referred to herein as "100 Base-T1 mode") or ii) a second transmission speed such as 1000 Mbits/s transmission speed, for example in accordance with the 1000 BASE-T1 Standard specified by IEEE 802.3 bp (also referred to herein as "1000 Base-T1 mode"). In other embodiments, the slave device is configured to detect whether the master device is operating with a particular PHY operating parameter among a plurality of possible PHY operating parameters (e.g., transmission speeds) that include transmission speeds other than the 100 Mbits/s transmission speed and/or 1000 Mbits/s transmission speed and/or among a plurality of PHY operating parameters other than different transmission speeds. As described in more detail below, the slave device is configured to detect the PHY operating parameter (or the PHY operating mode) of the master device based on one or more of i) a continuity of each of the one or more training signals (e.g., whether the training signal is continuous or is pulsed) received from the master device, ii) an amplitude of each of the one or more training signals received from the master device, iii) a fundamental frequency, or baud rate, of each of the one or more training signals received from the master device, iv) a modulation of each of the one or more training signals received from the master device, etc., in various embodiments. In other embodiments, other physical characteristics are additionally or alternatively utilized. The slave device is further configured to, upon detecting the PHY operating parameter (or the PHY operating mode) of the master device, control various components of the slave device to operate in a mode corresponding to the detected PHY operating parameter (or detected the PHY operating mode) of the master device, for subsequent communication with the master device, in an embodiment. Although embodiments below are generally described with reference to a slave device detecting at least one PHY operating parameter of a master device, it is noted that the slave device detects a PHY operating mode of the master device, in some embodiments.

Detection of the PHY operating parameter (or the PHY operating mode) of the master device based on one or more physical characteristics of one or more training signals received during the training phase of link establishment between the master device and the slave device allows the slave device to be dynamically (after start-up of the device) configured to operate in a mode corresponding to the PHY operating parameter (or the PHY operating mode) of the master device without performing a separate auto-negotiation used in traditional Ethernet networks, in an embodiment. Moreover, detection of the PHY operating parameter (or the PHY operating mode) of the master device based on one or more physical characteristics of one or more training signals received during the training phase of link establishment between the master device and the slave device can be performed by the slave device very quickly as compared to the more time-consuming auto-negotiation used in the traditional Ethernet networks. Such rapid detection of the PHY operating parameter (or the PHY operating mode) of the master device allows the slave device to be dynamically configured within a stringent link-up time requirement (e.g., within 100 milliseconds, as specified in the IEEE 802.3bw and the IEEE 802.3 bp Standards) in automotive applications. Thus, by enabling a slave device to quickly detect a PHY operating parameter (or the PHY operating mode) of a master device as part of a training phase of link establishment between the master device and the slave device, techniques described herein eliminate the need to pre-configure the slave device for operation with the PHY operating parameter (or the PHY operating mode) corresponding to the PHY operating parameter (or the PHY operating mode) of the master device while allowing the slave device to meet the stringent link-up time requirements of automotive systems, in various embodiments.

FIG. 1 is a block diagram of an example system 100 in which a slave device implements detection of at least one PHY operating parameter of a master device during a training phase of link establishment between the master device and the slave device, according to an embodiment. The system 100 includes a first network interface device 102 coupled to a second network interface device 104 via a network link 106. The first network interface device 102 and the second network interface devices 104 are associated with electronic devices of an automotive network system, in an embodiment. As just an example, the first network interface device 102 is associated with an accessory device, such as a camera or a telematics radio device, in an automobile and the second network interface device 104 is associated with a central processing unit in the automobile, in an embodiment. In other embodiments, the first network interface device 102 and/or the second network interface device 104 are associated with other suitable electronic devices in an automobile, such as an infotainment device, a sensor device, a control device, etc. in the automobile. The network link 106 between the network interface device 102 and the network interface device 104 comprises a single twisted pair copper link, in an embodiment. In another embodiment, the network link 106 is a suitable link different from a single twisted pair copper link. For example, the network link 106 is a multi-pair copper link, an optical link, a fiber link, a radio frequency plastic waveguide link, etc., in various embodiments. In some embodiments, the first network interface device 102 and the second network interface device 104 are utilized in networks other than an automotive network. For example, in some embodiments, the first network interface device 102 and the second network interface device 104 are utilized in an industrial or process industry network.

The network interface device 102 includes one or more physical layer (PHY) processors 130 (sometimes referred to herein as "the PHY processor 130" for brevity). The PHY processor 130 includes a transceiver 180 configured to transmit and receive signals over the link 106. The network interface device 102 also includes one or more media access control (MAC) processors 132 (sometimes referred to herein as "the MAC processor 132" for brevity) coupled to the PHY processor 130, in an embodiment. In another embodiment, the network interface device 102 omits the MAC processor 132. For example, the MAC processor 132 is external to the network interface device 102, in an embodiment.

The network interface device 102 is implemented using one or more integrated circuits (ICs) configured to operate as discussed below. For example, the PHY processor 130 may be implemented, at least partially, on a first IC, and the MAC processor 132 may be implemented, at least partially, on a second IC. As another example, at least a portion of the PHY processor 130 and at least a portion of the MAC processor 132 may be implemented on a single IC. For instance, the network interface device 102 may be implemented using a system on a chip (SoC), where the SoC includes at least a portion of the PHY processor 130 and at least a portion of the MAC processor 132.

The network interface device 104 includes one or more physical layer (PHY) processors 150 (sometimes referred to herein as "the PHY processor 150" for brevity). The PHY processor 150 includes a transceiver 190 configured to transmit and receive signals over the link 106. The network interface device 104 also includes one or more media access control (MAC) processors 152 (sometimes referred to herein as "the MAC processor 152" for brevity) coupled to the PHY processor 150, in an embodiment. In another embodiment, the network interface device 104 omits the MAC processor 152. For example, the MAC processor 152 is external to the network interface device 104, in an embodiment.

The network interface device 104 is implemented using one or more integrated circuits (ICs) configured to operate as discussed below. For example, the PHY processor 150 may be implemented, at least partially, on a first IC, and the MAC processor 152 may be implemented, at least partially, on a second IC. As another example, at least a portion of the PHY processor 150 and at least a portion of the MAC processor 152 may be implemented on a single IC. For instance, the network interface device 104 may be implemented using a system on a chip (SoC), where the SoC includes at least a portion of the PHY processor 150 and at least a portion of the MAC processor 152.

In various embodiments, a PHY processor (e.g., the PHY processor 130, 150) in the system 100 can be configured either as a master PHY processor or a slave PHY processor. A master PHY processor uses a free running local clock to determine the timing of transmitter operations. A slave PHY processor recovers the clock from the signal received from the master PHY processing device and uses the received signal to determine the timing of transmitter operations. Furthermore, the master PHY processor and the slave PHY processor are configured to synchronize their clocks and timing of transmitter operations during a training phase before entering normal data transmission phase. As an example, the PHY processor 130 of the network interface device 102 is configured as a master PHY processor (sometimes referred to herein as "master PHY processor 130"), and the PHY processor 150 of the network interface device 104 is configured as a slave PHY processor (sometimes referred to herein as "slave PHY processor 150"), in an embodiment.

The master PHY processor 130 is configured to operate with a PHY operating parameter (e.g., transmission speed) from among a plurality of possible PHY operating parameters (e.g., transmission speeds), in an embodiment. For example, the master PHY processor 130 is configured to operate with one of i) 100 Mbits/s transmission speed in accordance with the 100 BASE-T1 Standard or ii) 1000 Mbits/s transmission speed in accordance with the 1000 BASE-T1 Standard, in an embodiment. In another embodiment, the master PHY processor 130 is configured to operate with a PHY operating parameter selected from another suitable set of possible PHY operating parameters. For example, the master PHY processor 130 is configured to operate with a transmission speed selected from a set of transmission speeds including any combination of two or more of i) 100 Mbits/s transmission speed in accordance with the 100 BASE-T1 Standard or ii) 1000 Mbits/s transmission speed in accordance with the 1000 BASE-T1 Standard, iii) 10 Mbits/s transmission speed in accordance with the 10 Base-T1L Standard, iv) 10 Mbits/s transmission speed in accordance with the 10 Base-T1 S Standard, and v) a multi-gigabit transmission speed in accordance with a Multi-Gig Ethernet Standard, in an embodiment. In other embodiments, the master PHY processor 130 is configured to operate with a transmission speed selected from a different set of possible transmission speeds and/or configured to operate with a particular configurable PHY operating parameter other than a transmission speed. Although the master PHY processor 130 is generally described herein as The master PHY processor 130 includes a link training engine 182, in an embodiment. The link training engine 182 is configured to generate training signals 184 to enable the slave PHY processor 150 to recover a clock of, and synchronize operations with, the master PHY processor 130, in an embodiment. The transceiver 180 is configured to transmit the training signals 184 to the slave PHY processor 150 over the network link 106 during a training phase of link establishment between the network interface device 102 and the network interface device 104, in an embodiment. The transceiver 180 is also configured to receive training signals from the slave PHY processor 150 over the network link 106 during the training phase of link establishment between the network interface device 102 and the network interface device 104, in an embodiment. The link training engine 182 is configured to process training signals received from the slave PHY processor 150 to synchronize operations with the slave processor 150, in an embodiment.

In an embodiment, the link training engine 182 is implemented by a processor configured to execute machine readable instructions stored in a memory device (not shown) such as a RAM, a ROM, a flash memory, etc. In an embodiment, the link training engine 182 additionally or alternatively includes a hardware state machine that is configured to generate and process training signals such as described herein.

The transceiver 190 of the slave PHY processor 150 is configured to receive the training signals 184 transmitted by the master PHY processor 130 over the link 106 during the training phase of link establishment between the network interface device 102 and the network interface device 104. The transceiver 190 is configured to provide the received training signals 184 to a link training and clock recovery engine 192. The link training and clock recovery engine 192 is configured to recover a clock from the training signals 184, and to further synchronize operation of the slave PHY processor 150 with the master PHY processor 130 based on the training signals 184, in an embodiment. The link training and clock recovery engine 192 is also configured to generate training signals to enable the master PHY processor 130 to synchronize operation with the slave PHY processor 150. The transceiver 190 of the slave PHY processor 150 is configured to transmit the training signals generated by the link training and clock recovery engine 192 to the master PHY processor 130 over the link 106 during the training phase of link establishment between the network interface device 102 and the network interface device 104, in an embodiment.

In an embodiment, the transceiver 190 of the slave PHY processor 150 is also configured to provide one or more training signals 184 to a PHY operating parameter detector 194. The PHY operating parameter detector 194 is configured to detect a PHY operating parameter (e.g., the transmission speed) of the master PHY processor 130 based on one or more training signals 184, as described in more detail below, in an embodiment. The PHY operating parameter detector 194 is configured to provide an indication of the detected the PHY operating parameter of the master PHY processor 130 to a mode controller 198, in an embodiment. The mode controller 198 is configured to configure the slave PHY processor 150 and, in some embodiments, the MAC processor 152, to operate in a mode corresponding to the PHY operating parameter of the master PHY processor 130 detected by the PHY operating parameter detector 194, in an embodiment. For example, the mode controller 198 is configured to generate one or more control signals and to provide the one or more control signals to various components of the slave PHY processor 150 and/or the MAC processor 152 to configure the components of the slave PHY processor 150 and/or the MAC processor 152 to operate in a mode corresponding to the detected PHY operating parameter of the master PHY processor 130, in an embodiment.

In an embodiment, the link training and clock recovery engine 192 is implemented by a processor configured to execute machine readable instructions stored in a memory device (not shown) such as a RAM, a ROM, a flash memory, etc. In an embodiment, the link training and clock recovery engine 192 additionally or alternatively includes a hardware state machine that is configured to generate and process training signals such as described herein. Similarly, the PHY operating parameter detector 194 and the mode controller 198 are implemented by a processor configured to execute machine readable instructions stored in a memory device (not shown) such as a RAM, a ROM, a flash memory, etc. In an embodiment, the PHY operating parameter detector 194 and/or the mode controller 198 additionally or alternatively includes hardware configured to implement PHY operating parameter detection and mode control as described herein.

With continued reference to FIG. 1, in an embodiment, physical characteristics of the training signals 184 generated by the link training engine 182 of the master PHY processor 130 and transmitted by the transceiver 180 of the master PHY processor 130 during the training phase of link establishment between the network interface device 102 and the network interface device 104 depend on the particular PHY operating parameter (e.g., the particular transmission speed) with which the master PHY processor 130 is operating. For example one or more of i) a continuity of a training signal 184, ii) an amplitude (e.g., peak-to-peak voltage) of the training signal 184, iii) a modulation of the training signal 184, iv) a fundamental frequency, or baud rate, of the training signal 184, etc. depend on the particular PHY operating parameter (e.g., transmission speed) with which the master PHY processor 130 is operating, in various embodiments.

In an embodiment, the PHY operating parameter detector 194 of the salve PHY processor 150 is configured to detect the particular PHY operating parameter (e.g., the particular transmission speed) of the master PHY processor 130 based on one or more physical characteristics of one or more training signals 184 received from the master PHY processor 130 during the training phase of link establishment between the network interface device 102 and the network interface device 104. For example, the slave PHY processor 150 is configured to detect the particular PHY operating parameter of the master PHY processor 130 based on one or more physical characteristics of one or more initial (e.g., first) training signals 184 among a plurality of training signals 184 received from the master PHY processor 130 during the training phase of link establishment between the network interface device 102 and the network interface device 104, in an embodiment. As described in more detail below, the PHY operating parameter detector 194 is configured to detect the particular PHY operating parameter of the master PHY processor 130 based on one or more of i) a continuity of one or more training signals 184, ii) an amplitude (e.g., peak-to-peak voltage) of one or more training signals 184, iii) a modulation of one or more training signals 184, iv) a fundamental frequency of one or more training signals 184, etc., in various embodiments. In other embodiments, other suitable physical characteristics of the one or more training signals 184 are utilized. Detection of the PHY operating parameter of the master PHY processor 130 at the slave PHY processor 150 based on physical characteristics of one or more training signals 184 received from the master PHY processor 130 during the training phase of link establishment between the network interface device 102 and the network interface device 104 enables subsequent communication between the network interface device 102 and the network interface device 104 without a need to pre-configure the network interface device 104 for operation in a mode corresponding to the PHY operating parameter of the master PHY processor 130 of the network interface device 102 and without performing separate auto-negotiation to negotiate the PHY operating parameter between the slave PHY processor 150 and the master PHY processor 130, in various embodiments. Moreover, detection of the PHY operating parameter of the master PHY processor 130 of the network interface device 102 based on physical characteristics of the one or more training signals 184 received during the training phase of link establishment can be performed by the slave PHY processor 150 of the network interface device 104 sufficiently quickly to ensure that the network interface device 104 appropriately configured within a link-up time requirement (e.g., within 100 milliseconds) in automotive applications, in an embodiment.

Figure 2:
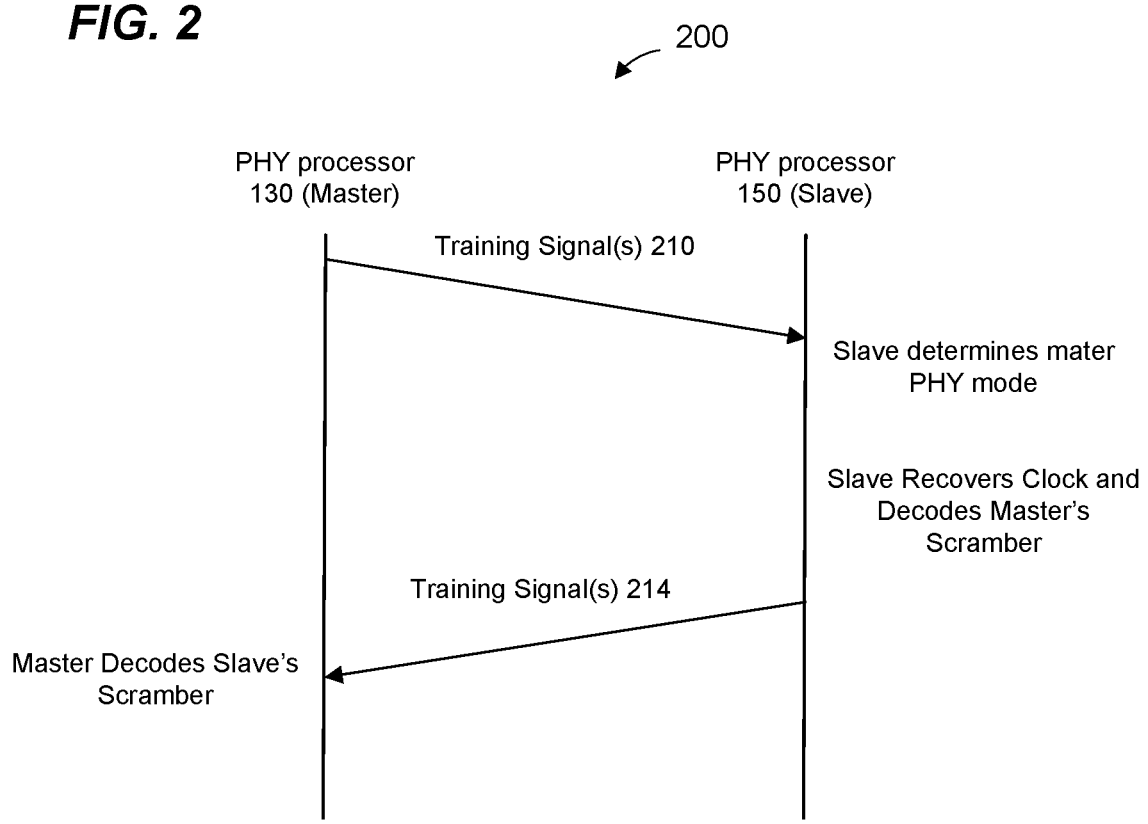
FIG. 2 is an example timing diagram of a training signal exchange sequence performed during a training phase of link establishment between the master device and the slave device of the system of FIG. 1, according to an embodiment.

FIG. 2 is an example timing diagram of a training signal exchange sequence 200, according to an embodiment. The training signal exchange sequence 200 is performed during a training phase of a link establishment process for establishing a communication link between the first network interface device 102 and the second network interface device 104 of the system 100 of FIG. 1, according to an embodiment. For ease of explanation, the training signal exchange sequence 200 is described in the context of the system 100 of FIG. 1. In other embodiments, the training signal exchange sequence 200 is utilized in a process of establishing communication links in systems different from the system 100 of FIG. 1.

The master PHY processor 130 of the network interface device 102 initiates the training signal exchange sequence 200 by transmitting training signals 210 to the slave PHY processor 150 of the network interface device 104 over the link 106. The training signals 210 correspond to the training signals 184 of FIG. 1, in an embodiment. The training signals 210 are generally used to synchronize operations of the slave PHY processor 150 with the master PHY processor 130, in an embodiment. For example, the training signals 210 are used by the slave PHY processor 150 to recover a clock of the master PHY processor 130 and to decode a scrambler seed of the master PHY processor 130, in an embodiment.

The training signals 210 have physical characteristics that depend on a particular PHY operating parameter of the master PHY processor 130, such a particular transmission speed of the master PHY processor 130, in an embodiment. For example, one or more of i) a continuity of each of one or more training signals 210, ii) an amplitude (e.g., peak-to-peak voltage) of each of one or more training signals 210, iii) a modulation of each of one or more training signals 210 and iv) a fundamental frequency of each of one or more training signals 210, etc. depends on the PHY operating parameter of the master PHY processor 130, in various embodiments.

As a more specific example, if the master PHY processor 130 is operating with a first PHY operating parameter (e.g. a first transmission speed, such as 100 Mbits/s transmission speed), then a training signal 210 is a continuous signal. On the other hand, if the master PHY processor 130 is operating with a second PHY operating parameter (e.g. a second transmission speed, such as 1000 Mbits/s transmission speed), then the training signal 210 is a pulsed signal having periods of transmission followed by periods of non-transmission, in an embodiment. As another example, if the master PHY processor 130 is operating with a first PHY operating parameter (e.g. a first transmission speed, such as 100 Mbits/s transmission speed), then a training signal 210 has a first amplitude (e.g., a first peak-to-peak voltage amplitude), whereas if the master PHY processor 130 is operating with a second PHY operating parameter (e.g. a second transmission speed, such as 1000 Mbits/s transmission speed), then the training signal 210 has a second amplitude (e.g., a second peak-to-peak voltage amplitude) that is greater than the first amplitude, in an embodiment. As yet another example, if the master PHY processor 130 is operating with a first PHY operating parameter (e.g. a first transmission speed, such as 100 Mbits/s transmission speed), then a training signal 210 is a three-level modulated signal, such as a three-level pulse-amplitude modulated (PAM3) signal, whereas if the master PHY processor 130 is operating with a second PHY operating parameter (e.g. a second transmission speed, such as 1000 Mbits/s transmission speed), then the training signal 210 is a two-level modulated signal, such as a PAM2 signal, in an embodiment.

The slave PHY processor 150 is configured to detect the PHY operating parameter of the master PHY processor 130 based on one or more physical characteristics of one or more training signals 210 (e.g., one or more initial training signals 210 transmitted by the master PHY processor 130 during the link establishment process), in an embodiment. For example, the slave PHY processor 150 is configured to obtain and process one or more samples of a training signal 210 and to detect the PHY operating parameter of the master PHY processor 130 based on at least one physical characteristic derived from the one or more samples of the training signal 210. In various embodiments, the slave PHY processor 150 is configured to determine the PHY operating parameter of the master PHY processor 130 based on one or more of i) a continuity of each of one or more training signals 210, ii) an amplitude (e.g., a peak-to-peak voltage amplitude) of each of one or more training signals 210, iii) a modulation of each of one or more training signals 210 and iv) a fundamental frequency, or baud rate, of each of one or more of the training signals 210. As a more specific example, the slave PHY processor 150 is configured to measure an amplitude (e.g., a peak-to-peak voltage) of each of the one or more training signals 210, compare the measured amplitude to a threshold, and determine that a) the master PHY processor 130 is operating with a first PHY operating parameter (e.g., a first transmission speed) if the measured amplitude exceeds the threshold orb) the master PHY processor 130 is operating with a second PHY operating parameter (e.g., a second transmission speed) if the measured amplitude does not exceed the threshold, or vice-versa, in an embodiment.

With continued reference to FIG. 2, as another example, the slave PHY processor 150 is configured to determine whether each of the one or more training signals 210 comprises a continuous signal or a pulsed non-continuous signal, and determine that a) the master PHY processor 130 is operating with a first PHY operating parameter (e.g., a first transmission speed) in response to determining that the training signal 210 comprises a continuous signal orb) that the master PHY processor 130 is operating with a second PHY operating parameter (e.g., a second transmission speed) in response to determining that the training signal 210 comprises a pulsed non-continuous signal, or vice-versa, in an embodiment. As yet another example, the slave PHY processor 150 is configured to determine a number of distinct amplitudes (e.g., number of distinct bit levels) in the training signal 210, and to determine the PHY operating parameter of the master PHY processor 130 based on whether the training signal 210 comprises three amplitudes corresponding to a three-level modulation (e.g., PAM3) or comprises two amplitudes corresponding to a bi-level modulation (e.g., PAM2).

In another embodiment, the slave PHY processor 150 is configured to determine a fundamental frequency of the training signal 210, for example by measuring a time interval between two consecutive rising edges in the training signal 210, and to determine the PHY operating parameter of the master PHY processor 130 based on whether the training signal 210 comprises a relatively higher or a relatively lower fundamental frequency. As yet another embodiment, the slave PHY processor 150 is configured to switch between multiple filter shapes (e.g., high pass filter, low pass filter, filters having different cut-off frequencies, etc.) for filtering received training signals 210, and to attempt to recover a clock from the filtered training signals 210. In this embodiment, the slave PHY processor 150 is configured to determine the PHY operating parameter of the master PHY 130 based on which shape of filter provided a filtered training signal from which the clock could be recovered. In other embodiments, the slave PHY processor 150 is configured to additionally or alternatively use other suitable detection methods for detecting a PHY operating parameter of the master PHY processor 130 based on one or more physical characteristics of one or more training signals 210.

In some embodiments, the slave PHY processor 150 is configured to detect the PHY operating parameter of the master PHY processor 130 based on a combination of multiple physical characteristics of the one or more training signals 210. For example, in an embodiment, the slave PHY processor 150 is configured to detect a PHY operating parameter of the master PHY processor 130 based on any suitable combination of two or more of i) a continuity of each of one or more training signals 210, ii) an amplitude (e.g., a peak-to-peak voltage amplitude) of each of one or more training signals 210, iii) a modulation of each of the one or more training signals 210 and iv) a frequency of each of one or more of the training signals 210. As just an example, in an embodiment, if both i) a measured amplitude of a training signal 210 exceeds a threshold and ii) the training signal 210 comprises a continuous signal, then the slave PHY processor 150 determines that the master PHY processor 130 is operating with a first PHY operating parameter (e.g., a first transmission speed). Further, if both i) the measured amplitude of the training signal 210 does not exceed the threshold and ii) the training signal 210 comprises a pulsed signal, then the slave PHY processor 150 determines that the master PHY processor 130 is operating with a second PHY operating parameter (e.g., a second transmission speed), in an embodiment. However, if only one of the conditions i) the measured amplitude of the training signal 210 exceeds a threshold and ii) the training signal 210 comprises a continuous signal is true, then the slave PHY processor 150 cannot determine the PHY operating parameter of the master PHY processor 130 based on the training signal 210, in an embodiment. In this case, the slave PHY processor 150 repeats the amplitude and/or the continuity measurements based on one or more additional training signals 210 and/or utilizes one or more other physical characteristics of the training signals 210 in order to make the determination of the PHY operating parameter of the master PHY processor 130, in an embodiment.

Upon determining the PHY operating parameter of the master PHY processor 130, the slave PHY processor 150 configures (e.g., the mode controller 198 configures) components of the slave PHY processor 150 (and, in some embodiments, component of the MAC processor 172) to operate in a mode corresponding to the determined PHY operating parameter of the master PHY processor 130, in an embodiment. For example, the PHY processor 150 configures (e.g., the mode controller 198 configures) components of the slave PHY processor 150 to operate with a transmission speed and/or according to a communication standard that corresponds to the detected PHY operating parameter of the master PHY processor 130, in an embodiment. The slave PHY processor 150 is additionally configured to synchronize with the master processor 130 using the training signals 210, in an embodiment. For example, the PHY processor 150 is configured to use the training signals 210 to recover a clock and/or to decode a scrambler seed to be used in subsequent data communications with the master PHY processor 130, in various embodiments.

With continued reference to FIG. 2, the training signal exchange sequence 200 continues with transmission of one or more training signals 214 from the slave PHY processor 150 to the master PHY processor 130. In an embodiment, the slave PHY processor 150 generates the one or more training signals 214 in accordance with the determined PHY operating parameter of the master PHY processor 130. For example, when the slave PHY processor 150 determines that the master PHY processor 130 is operating with a first PHY operating parameter, the slave PHY processor 150 generates the one or more training signals 214 to conform to a training signal format (e.g., with corresponding physical characteristics) corresponding to the first PHY operating parameter, in an embodiment. On the other hand, when the slave PHY processor 150 determines that the master PHY processor 130 is operating with a second PHY operating parameter, the slave PHY processor 150 generates the one or more training signals 214 to conform to a training signal format (e.g., with corresponding physical characteristics) corresponding to the second PHY operating parameter, in an embodiment. Accordingly, the one or more training signals 214 have the same physical characteristics as the one or more training signal 210, in this embodiment.

The master PHY processor 130 receives the one or more training signals 214 from the slave PHY processor 150, and utilizes the one or more training signals 214 to synchronize with the slave PHY processor 150. For example, the master PHY processor 130 decodes a scrambler seed from the one or more training signals 214, and utilizes the scrambler seed in subsequent data communications with the slave PHY processor 150, in an embodiment. The training phase of the link establishment process is then complete, and data communications with the detected PHY operating parameter (e.g., the detected transmission speed) can begin, in an embodiment.

Figure 3A:
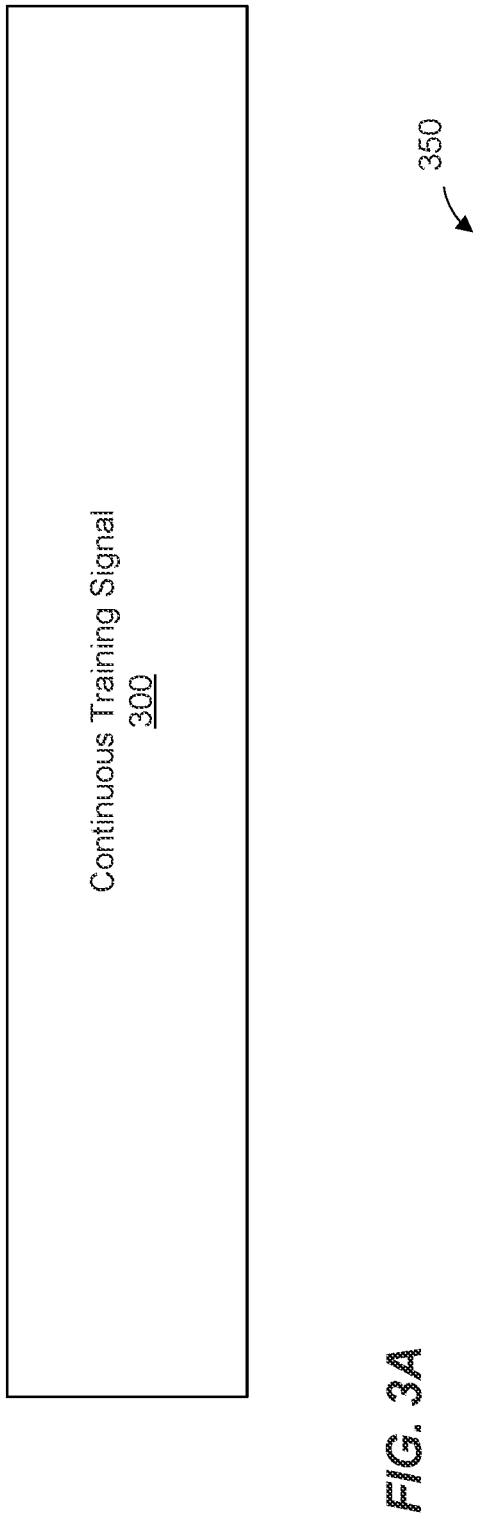
FIG. 3A is a diagram of a training signal transmitted in a training phase of link establishment between the master device and the slave device of the system of FIG. 1, according to an embodiment.
Figure 3B:
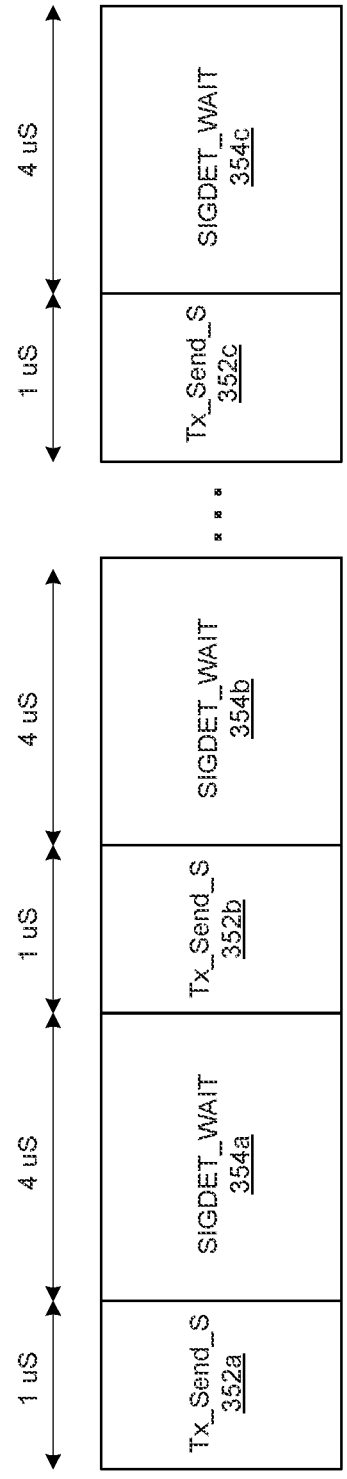
FIG. 3B is a diagram of another training signal transmitted in a training phase of link establishment between the master device and the slave device of the system of FIG. 1, according to another embodiment.

FIGS. 3A-B are diagrams of training signals 300, 350 transmitted during a training phase of a link establishment process, according to an embodiment. The training signals 300, 350 correspond to the training signal 184 transmitted by the master PHY processor 130 to the slave PHY processor 150 in the system 100 of FIG. 1, in an embodiment. The training signal 300 is generated and transmitted by the master PHY processor 130 if the master PHY processor 130 is operating with a first PHY operating parameter (e.g., a 100 Mbits/s transmission speed in accordance with the 100 BASE-T1 Standard), whereas the training signal 350 is generated and transmitted by the master PHY processor 130 if the master PHY processor 130 is operating with a second PHY operating parameter (e.g., a 1000 Mbits/s transmission speed in accordance with the 1000 BASE-T1 Standard), in an embodiment.

Referring first to FIG. 3A, in an embodiment, the training signal 300 is a continuous signal specific to operation with the first PHY operating parameter, in an embodiment. Additionally or alternatively, the training signal 300 has one or more of the following physical characteristics specific to operation with the first PHY operating parameter: i) the training signal 300 has a first amplitude (e.g., a first peak-to-peak voltage), ii) the training signal 300 has a first fundamental frequency, or first baud rate, and iii) the training signal 300 is modulated using a first modulation scheme. As a more specific example, in an embodiment in which the training signal 300 conforms to the 100 Base-T1 Standard specified by IEEE 802.3bw, the training signal 300 is a continuous signal having the following additional physical characteristics specified by the 100 Base-T1 Standard ii) the training signal 300 has a first peak-to-peak voltage that is relatively greater (e.g., 0.5V greater) as compared to a second peak-to-peak voltage of the training signal 350, iii) the training signal 300 is a three-level (PAM3) modulated signal, and iv) the training signal 300 has a fundamental frequency of 66 MHz. In other embodiments, the training signal 300 has other suitable physical characteristics specific to operation with the first PHY operating parameter.

Turning now to FIG. 3B, the training signal 350 is a pulsed signal specific to operation with the second PHY operating parameter, in an embodiment. Additionally or alternatively, the training signal 350 has one or more of the following physical characteristics specific to operation with the second PHY operating parameter: i) the training signal 350 has a second amplitude (e.g., a second peak-to-peak voltage) different from the first amplitude of the training signal 300, ii) the training signal 350 has a second fundamental frequency, or second baud rate, different from the first fundamental frequency, or first baud rate, of the training signal 300 and iii) the training signal 350 is modulated using a second modulation scheme different from the first modulation scheme used with the training signal 300. As a more specific example, in an embodiment in which the training signal 350 conforms to the 1000 Base-T1 Standard specified by IEEE 802.3 bp, the training signal 350 is a pulsed signal having periods 352 of transmission of a Tx_Send_S signal and SIGDET_WAIT periods 354 of no signal transmission. Each transmission period 352 has a duration of and each SIGDET_WAIT period 354 has a duration of 4 µs, in an embodiment. In other embodiments, the training signal 350 includes transmission periods having durations other than 1 µs and/or periods of non-transmission having durations other than 4 µs. In addition to the signal 350 being a pulsed signal, in an embodiment in which the training signal 350 conforms to the 1000 Base-T1 Standard specified by IEEE 802.3 bp, the training signal 350 has the following additional physical characteristics specified by the 1000 Base-T1 Standard ii) the training signal 350 has a second peak-to-peak voltage that is relatively smaller (e.g., 0.5V smaller) as compared to the first peak-to-peak voltage of the training signal 300, iii) the training signal 350 is a bi-level (e.g., PAM2) modulated signal, and iv) the training signal 350 has a fundamental frequency of 750 MHz. In other embodiments, the training signal 350 has other physical characteristics specific to operation with the second PHY operating parameter.

Figure 4:
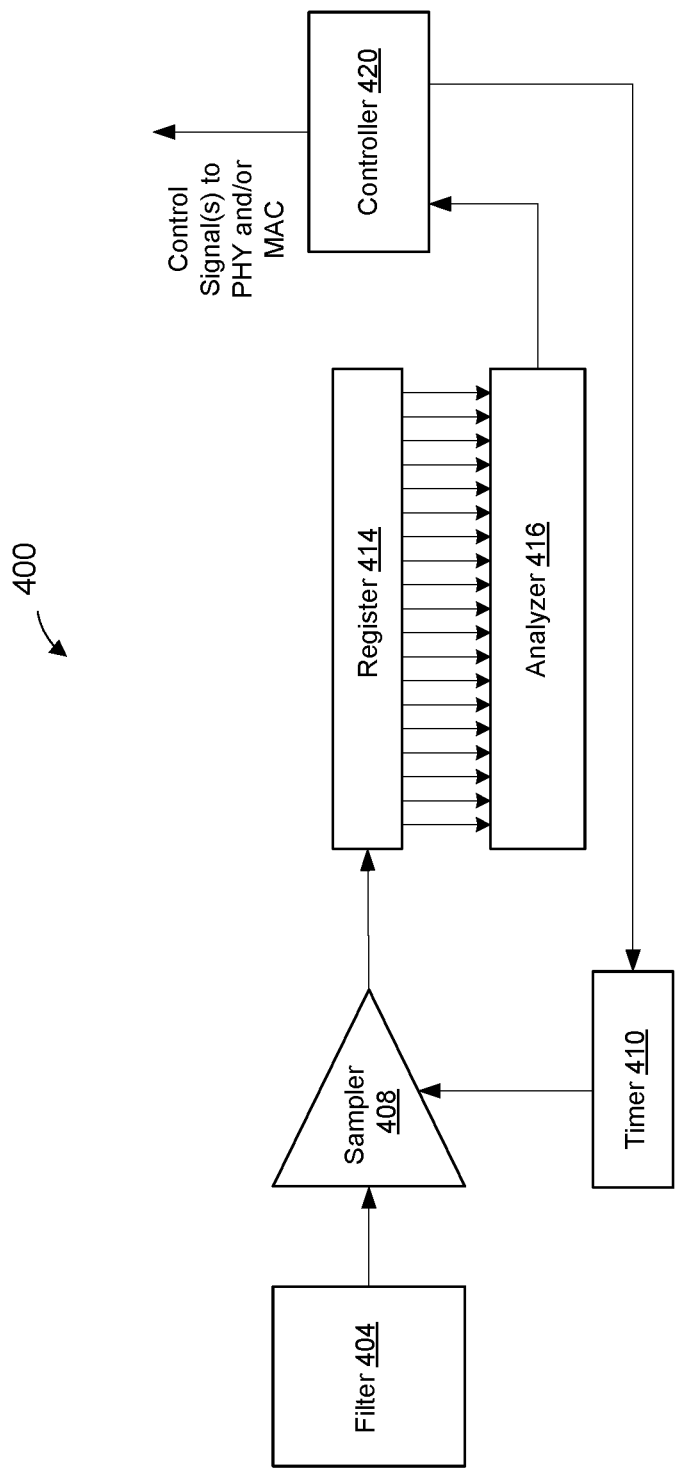
FIG. 4 is a block diagram of a PHY operating parameter detector included in the slave device of FIG. 1, according to an embodiment.

FIG. 4 is a block diagram of a PHY operating parameter detector 400, according to an embodiment. The PHY operating parameter detector 400 corresponds to the PHY operating parameter detector 194 of the slave PHY processor 150 of the network interface device 104 of the system 100 of FIG. 1, in an embodiment. The PHY operating parameter detector 400 is configured to detect a PHY operating parameter of the master PHY processor 130 based on continuity characteristics of one or more training signals (e.g., training signals 184) received from the master PHY processor 130, in an embodiment. For ease of explanation, the PHY operating parameter detector 400 is described with reference to the system 100 of FIG. 1. In other embodiments, however, the PHY operating parameter detector 400 is used with a suitable system different from the system 100 of FIG. 1.

The PHY operating parameter detector 400 is configured to measure continuity characteristics of one or more training signal 184 and to determine whether each of the one or more training signals 184 has one of a plurality of predetermined continuity characteristics specific to operation with respective possible PHY operating parameters of the master PHY processor 130, in an embodiment. For example, the PHY operating parameter detector 400 is configured to determine whether the training signal 184 corresponds to i) a first training signal (e.g., the training signal 300 of FIG. 3A) having continuity characteristics specific to operation with a first PHY operating parameter (e.g., a first transmission speed) or ii) a second training signal (e.g., the training signal 350 of FIG. 3B) having continuity characteristics specific to operation with a second PHY operating parameter (e.g., a second transmission speed), in an embodiment.

The PHY operating parameter detector 400 includes a filter 404 coupled a sampler 408. The filter 404 is a binary classifier filter, in an embodiment. The filter 404 is configured to classify a received training signal 184 at any given time as either corresponding to a period of transmission in the training signal 184 or corresponding to a period of non-transmission in the training signal 184, in an embodiment. The sampler 408 is configured to sample the output of the filter 404 at a particular sampling interval controlled by a timer 410, in an embodiment. In an embodiment, the sampling interval is 1 µs. In this embodiment, the sampler 408 obtains a sample of the output of the filter 404 every 1 µs. Thus, referring for example to FIGS. 3A-B, if the training signal 184 corresponds to the continuous training signal 300 of FIG. 3A, then the samples of the output of the filter 404 obtained every 1 µs by the sampler 408 generally all correspond to times of transmission in the training signal 184. On the other hand, if the training signal 184 corresponds to the pulsed training signal 350 of FIG. 3B, then the samples of the output of the filter 404 obtained every 1 µs by the sampler 408 include a sample corresponding to a time of transmission in the training signal 184 followed by four samples corresponding to times of non-transmission in the training signal 184, in this embodiment. That is, if the training signal 184 corresponds to the pulsed training signal 350 of FIG. 3B, the ratio of samples corresponding to times of transmission in the training signal 184 to a total number of samples is 1:5, in this embodiment. In other embodiments, other suitable sampling intervals, such as sampling intervals corresponding to training signal periodicities different from the periodicity of the training signal 350 of FIG. 3B, are utilized.

The output of the sampler 408 is coupled to a register 414. The register 414 is a shift register configured store a plurality of consecutive samples obtained by the obtained by the sampler 408, in an embodiment. In another embodiment, the register 414 is another suitable type of register configured store a plurality of samples obtained by the obtained by the sampler 408. In an embodiment, the register 414 is configured store 100 samples obtained by the obtained by the sampler 408. In another embodiment, register 414 is configured to store another suitable number of samples obtained by the sampler 408.

Samples stored in the register 414 are provided to an analyzer 416, in an embodiment. The analyzer 416 is configured to count a number of samples in the register 414 corresponding to times of transmission in the training signal 184 and/or a number of samples in the register 414 corresponding to times of non-transmission in the training signal 184. The analyzer 416 is further configured to, based on the number of samples in the register 414 corresponding to times of transmission in the training signal 184 and/or on the number of samples in the register 414 corresponding to times of non-transmission in the training signal 184, determine whether the training signal 184 corresponds to a training signal having one of a plurality of predetermined continuity characteristics specific to training signals used with respective possible PHY operating parameters of the master PHY processor 130, in an embodiment. Continuing, for example, with the example training signals 300, 350 of FIGS. 3A-B, in an embodiment in which the register 414 stores 100 samples, if the number of samples corresponding to periods of transmission in the training signal 184 is at least substantially equal to 100 (e.g., 100+/−0, 100+/−1, etc.), then the analyzer 416 determines that the training signal 184 corresponds to the continuous signal 300 of FIG. 3A. In this case, the analyzer 416 determines that the master PHY processor 130 is operating with 100 Mbits/s transmission speed in accordance with the 100 Base-T1 Standard, according to an embodiment. On the other hand, if the number of samples corresponding to periods of transmission in the training signal 184 is at least substantially equal to 20 (e.g., 20+/−0, 20+/−1, etc.), then the analyzer 416 determines that the training signal 184 corresponds to the non-continuous signal 350 of FIG. 3B. In this case, the analyzer 416 determines that the master PHY processor 130 is operating with 1000 Mbits/s transmission speed in accordance with the 1000 Base-T1 Standard, according to an embodiment.

The analyzer 416 is configured to provide a signal indicative of the determined PHY operating parameter of the master PHY processor 130 to a controller 420, in an embodiment. The controller 420 is configured to generate control signals to control various components of the slave PHY processor 150 to operate in a mode corresponding to the determined the PHY operating parameter of the master PHY processor 130. Thus, for example, if the analyzer 416 determines that the master PHY processor 130 is operating with 100 Mbits/s transmission speed, then the controller 420 generates one or more control signals to configure one or more components of the slave PHY processor 150 to operate in a mode corresponding to the 100 Mbits/s transmission speed (e.g., the 100 Base-T1 mode), in an embodiment. On the other hand, if the analyzer 416 determines that the master PHY processor 130 is operating with 1000 Mbits/s transmission speed, then the controller 420 generates one or more control signals to configure one or more components of the slave PHY processor 150 to operate in a mode corresponding to the 1000 Mbits/s transmission speed (e.g., the 1000 Base-T1 mode), in an embodiment.

In some embodiments, the controller 420 is additionally configured to trigger the timer 410 to begin and stop collection of samples by the sampler 408. For example, the controller 420 is configured to enable or otherwise control the timer 408 so that collection of samples by the sampler 408 is initiated at start-up of the PHY processor 150 or at a beginning of a training phase of a link establishment procedure performed by the PHY processor 150. Subsequently, when the PHY operating parameter of the master PHY processor 130 is determined by the PHY operating parameter detection device 400, the controller 420 disables or otherwise control the timer 408 so that collection of by the sampler 408 is suspended, in an embodiment.

In some embodiments, in a case that the analyzer 416 determines that the training signal 184 does not correspond to one of the plurality of predetermined continuity characteristics specific to operation with respective possible PHY operating parameters of the master PHY processor 130, the analyzer 416 signals the controller 420 that the PHY operating parameter of the master PHY processor 130 cannot be determined based on the one or more training signals 184. Then one or more additional training signals 184 are sampled and analyzed until the analyzer 416 is able to determine the PHY operating parameter of the master PHY processor 130, in an embodiment.

Figure 5:
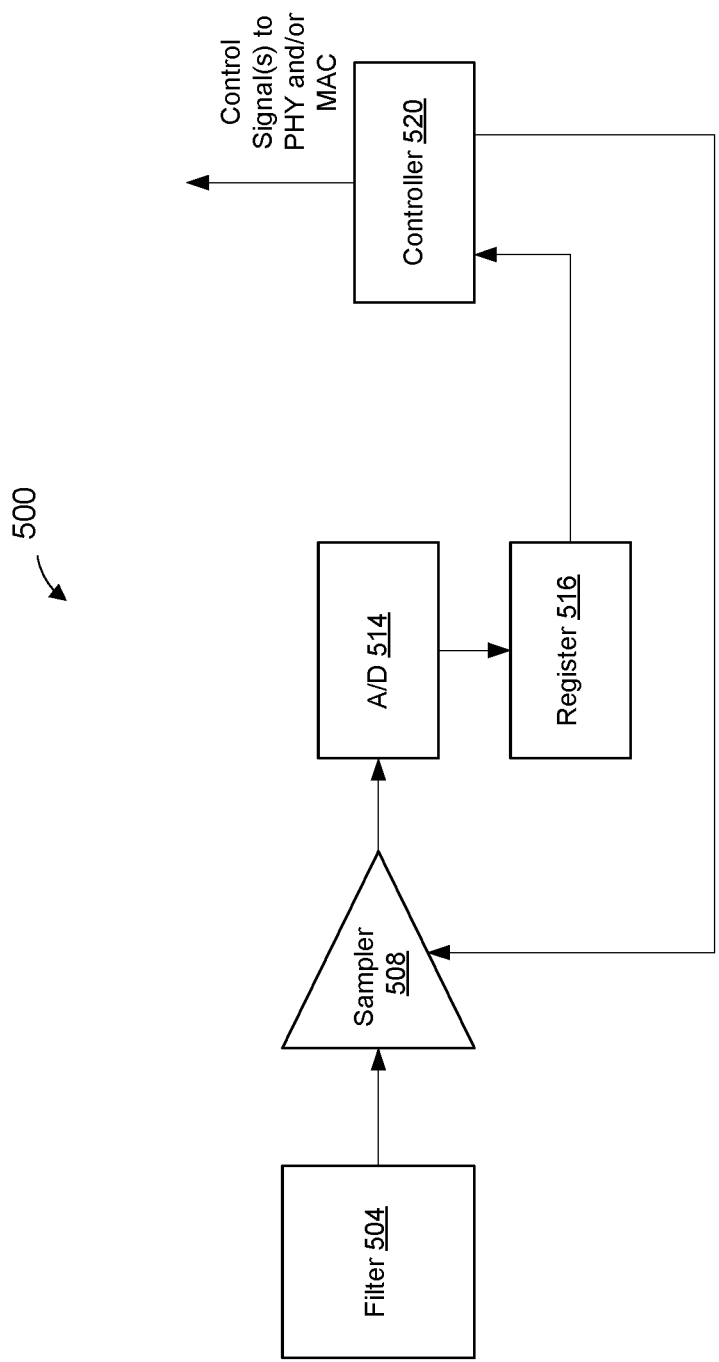
FIG. 5 is a block diagram of a PHY operating parameter detector included in the slave device of FIG. 1, according to an embodiment.

FIG. 5 is a block diagram of a PHY operating parameter detector 500, according to an embodiment. The PHY operating parameter detector 500 corresponds to the PHY operating parameter detector 194 of the slave PHY processor 150 of the network interface device 104 of the system 100 of FIG. 1, in an embodiment. The PHY operating parameter detector 500 is configured to detect a PHY operating parameter of the master PHY processor 130 based on amplitude and/or frequency characteristics of one or more training signals (e.g., training signals 184) received from the master PHY processor 130, in an embodiment. For ease of explanation, the PHY operating parameter detector 500 is described with reference to the system 100 of FIG. 1. In other embodiments, however, the PHY operating parameter detector 500 is used with a suitable system different from the system 100 of FIG. 1.

In various embodiments, the PHY operating parameter detector 500 is configured to measure amplitude and/or frequency characteristics of one or more training signal 184, and to determine whether the training signals 184 correspond to training signals having one of a plurality of predetermined amplitude and/or frequency characteristics specific to operation with respective possible PHY operating parameters of the master PHY processor 130. For example, the PHY operating parameter detector 500 is configured to determine whether the training signal 184 corresponds to i) a first training signal (e.g., the training signal 300 of FIG. 3A) having amplitude and/or frequency characteristics specific operation with a first PHY operating parameter (e.g., a first transmission speed) or ii) a second training signal (e.g., the training signal 350 of FIG. 3B) having amplitude and/or frequency characteristics specific to operation with a second PHY operating parameter (e.g., a second transmission speed), in an embodiment.

The PHY operating parameter detector 500 includes a filter 504, a sampler 508, an analog-to-digital converter (ADC) 514, a register 516, and a controller 520. The filter 504 is configured to filter the training signal 184 and to provide the filtered training signal 184 to a sampler 508. The sampler 508 is triggered by the controller 520 to obtain one or more samples of the training signal 184 as needed to accurately determine the particular PHY operating parameter of the master PHY processor 130 based on the amplitude and/or frequency characteristics of the training signal 184. The ADC 514 digitizes the samples obtained by the sampler 508, and the digitized samples are stored in the register 516.

The controller 520 is configured to retrieve the digitized samples of the training signal 184 from the register 516 and to determine, based on the digitized samples of the training signal 184, whether training signal 184 corresponds to a training signal having one of a plurality of predetermined amplitude and/or frequency characteristics specific to operation with respective possible PHY operating parameters of the master PHY processor 130, in an embodiment.

For example, in an embodiment, the controller 520 is configured to determine, based on the digitized samples of the training signal 184, a peak to peak amplitude (e.g., peak-to-peak voltage) of the training signal 184, and to compare the peak-to-peak amplitude with a threshold amplitude set to a value between a first amplitude specific to training signals used in operation with a first PHY operating parameter (e.g., 100 Mbits/s transmission speed) and a second amplitude specific to training signals used in operation with a second PHY operating parameter (e.g., 1000 Mbits/s transmission speed). In an embodiment, if the peak-to-peak voltage of the training signal 184 exceeds the threshold, then the controller 520 determines that the training signal 184 corresponds to a first training signal (e.g., the training signal 300 of FIG. 3A) having amplitude specific to training signals used in operation with the first PHY operating parameter (e.g., 100 Mbits/s transmission speed). Accordingly, in this case, the controller 520 determines that the master PHY processor 130 is operating with the first PHY operating parameter (e.g., 100 Mbits/s transmission speed). On the other hand, if the peak-to-peak voltage of the training signal 184 does not exceed the threshold, then the controller 520 determines that the training signal 184 corresponds to a second training signal (e.g., the training signal 350 of FIG. 3B) having amplitude specific to training signals used in operation with a second PHY operating parameter (e.g., 1000 Mbits/s transmission speed), in an embodiment. Accordingly, in this case, the controller 520 determines that the master PHY processor 130 is operating with the second PHY operating parameter (e.g., 1000 Mbits/s transmission speed).

As another example, the controller 520 is configured to determine, based on the digitized samples of the training signal 184, a minimum time between two consecutive rising edges in the training signal 184, in an embodiment. For example, the controller 520 applies a first trigger at a first time when a rising edge of the training signal 184 crosses a voltage threshold (e.g., 0.5 V or another suitable threshold voltage) and applies a second trigger at a second time when a rising edge of the training signal 184 again crosses the voltage threshold. The controller 520 then measures a time between the first trigger and the second trigger, and compares the measured time between the first trigger and the second trigger to a time threshold set to a value between a first time interval specific to a first fundamental frequency, or first baud rate, of training signals used in operation with a first PHY operating parameter (e.g., 100 Mbits/s transmission speed) and a second time interval specific to a second fundamental frequency, or second baud rate, of training signals used in operation with a second PHY operating parameter (e.g., 1000 Mbits/s transmission speed). In an embodiment, if the time between the first trigger and the second trigger exceeds the time threshold, then the controller 520 determines that the training signal 184 corresponds to a first training signal (e.g., the training signal 300 of FIG. 3A) having the first fundamental frequency, or first baud rate, specific to training signals used with the first PHY operating parameter (e.g., 100 Mbits/s transmission speed). Accordingly, in this case, the controller 520 determines that the master PHY processor 130 is operating with the first PHY operating parameter (e.g., 100 Mbits/s transmission speed). On the other hand, if the time between the first trigger and the second trigger does not exceed the time threshold, then the controller 520 determines that the training signal 184 corresponds to a second training signal (e.g., the training signal 350 of FIG. 3B) having the second fundamental frequency, or second baud rate, specific to training signals used with the second PHY operating parameter (e.g., 1000 Mbits/s transmission speed). Accordingly, in this case, the controller 520 determines that the master PHY processor 130 is operating with the second PHY operating parameter (e.g., 1000 Mbits/s transmission speed), in an embodiment.

Figure 6:
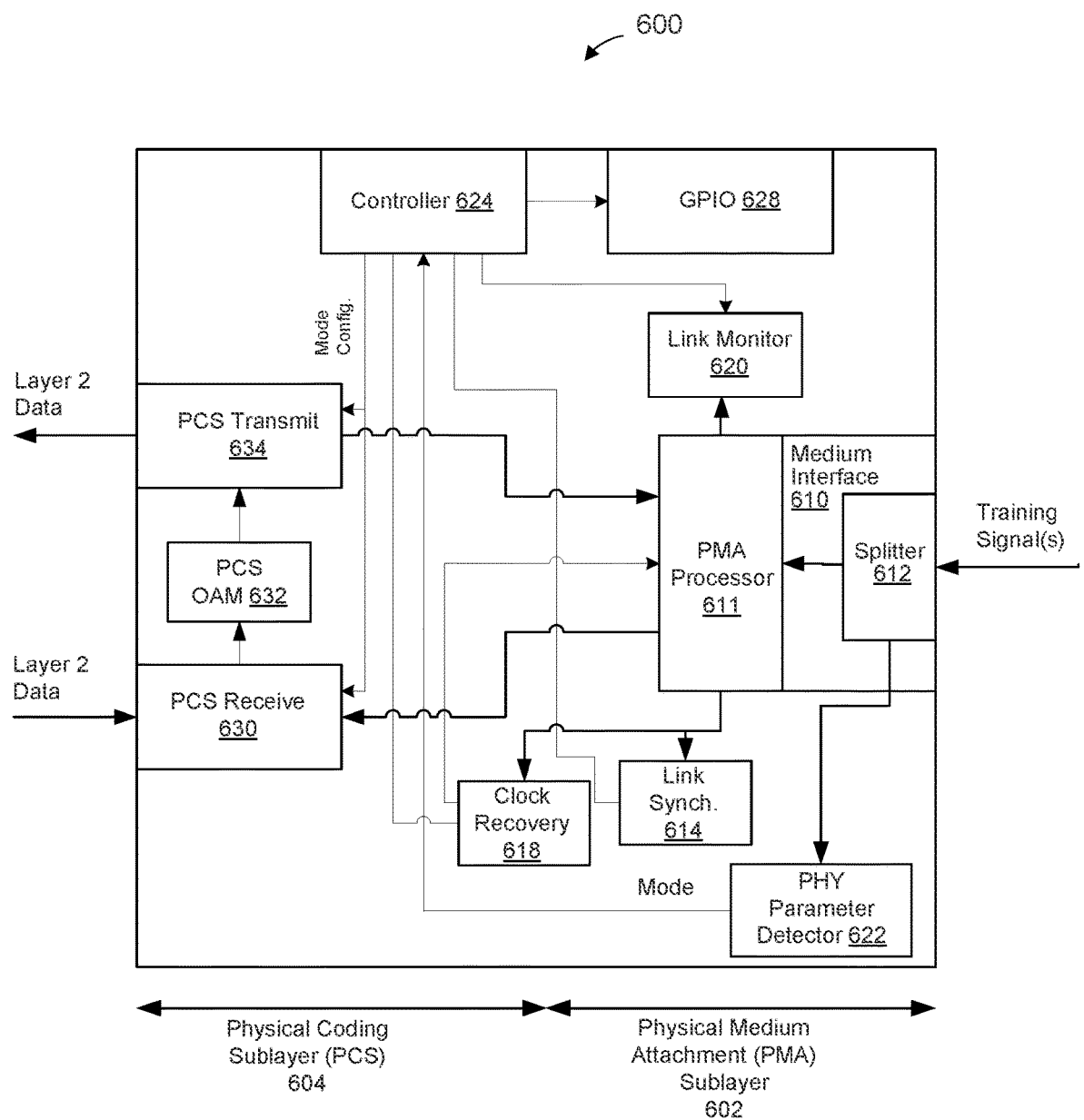
FIG. 6 is a block diagram of a PHY processor included in the slave device of FIG. 1, according to an embodiment.

FIG. 6 is a block diagram of a PHY processor 600, according to an embodiment. In an embodiment, the PHY processor 600 is configured as a slave PHY processor, and the PHY processor 600 is sometimes referred to herein as a "slave PHY processor 600." The slave PHY processor 600 corresponds to the slave PHY processor 150 of the network interface device 104 of the system 100 of FIG. 1, in an embodiment. For ease of explanation, the slave PHY processor 600 is described with reference to the system 100 of FIG. 1. In other embodiments, however, the slave PHY processor 600 is used with a suitable system different from the system 100 of FIG. 1.

The slave PHY processor 600 includes a physical medium attachment (PMA) sublayer 602 and a physical coding sublayer (PSC) 604. The PMA sublayer 602 includes a medium interface 610 coupled to a PMA processor 611. The PMA sublayer 602 also includes a link synchronizer 614, a cock recovery engine 618, a link monitor 620, and a PHY operating parameter detector 622. The PCS 604 includes a PCS receiver 630, an operations, administration, and maintenance (OAM) engine 632 and a PCS transmitter 634. The slave PHY processor 600 also includes a controller 644 and a general purpose input/output (GPIO) interface 648, in an embodiment.

The medium interface 610 is a single twisted pair copper interface, in an embodiment. In another embodiment, the medium interface 610 is a suitable interface different from the single twisted pair copper interface. The medium interface 610 includes a splitter 612 configured to split training signals (e.g., training signals 184) received, via the interface 610, during a training phase of a link establishment procedure performed between the PHY processor 600 in the PHY processor 130 to both i) the link synchronizer 614 and the clock recovery engine 618 and ii) the PHY operating parameter detector 622. The link synchronizer 614 and the clock recovery engine 618 are configured to, respectively, synchronize operation with (e.g., decode a scrambler seed of), and recover a clock of, the master PHY processor 130, in an embodiment. The PHY operating parameter detector 622 is configured to determine a PHY operating parameter (e.g., transmission speed) of the master PHY processor 130 based on one or more training signals 184, in an embodiment. The PHY operating parameter detector 622 comprises one or both of the PHY operating parameter detector 400 of FIG. 4 and the PHY operating parameter detector 500 of FIG. 5, in various embodiments. In other embodiments, other suitable PHY operating parameter detectors are utilized.

In an embodiment, the PHY operating parameter detector 622 determines the PHY operating parameter of the master PHY processor 130 based on one or more physical characteristics of one or more training signals 184 (e.g., one or more initial training signals transmitted by the master PHY processor 130 during a training phase of link establishment between the master PHY processor 130 and the slave PHY processor 600) received during a training phase of a link establishment procedure, in an embodiment. The PHY operating parameter detector 622 is further configured to provide an indication of the determined PHY operating parameter to the controller 624, in an embodiment. The controller 624 is configured to control (e.g., configure) one or more components of the slave PHY processor 600 (and, in some embodiments, of a MAC processor coupled to the slave PHY processor 600) to operate in a mode corresponding to the detected PHY operating parameter of the master PHY processor 130, in an embodiment.

Figure 7:
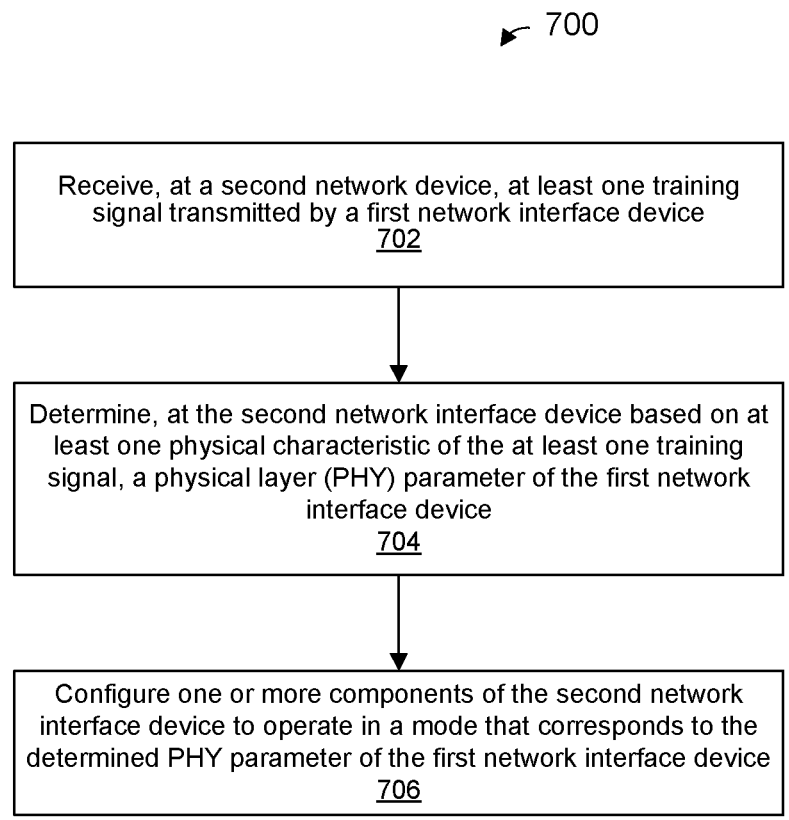
FIG. 7 is a flow diagram of an example method for establishing a communication link between a first network interface device and a second network interface device, according to an embodiment.

FIG. 7 is a flow diagram of an example method 700 for establishing a communication link between a first network interface device and a second network interface device, according to an embodiment. The method 700 is implemented by a slave device, such as the slave PHY processor 150 of FIG. 1, to automatically detect a PHY operating parameter (e.g., transmission speed) of a master device such as the master PHY processor 130 in FIG. 1, in an embodiment. For ease of explanation, the method 700 is described herein in the context of the first network interface device being a master device (sometimes referred to herein as a "master network interface device") and the second network interface device being a slave device (sometimes referred to herein as a "master network interface device").

At block 702, the slave network interface device receives (e.g., the second network interface device 104 receives, the slave PHY processor 150 receives, etc.) a training signal transmitted by the master network interface device (e.g., transmitted by the first network interface device 102, transmitted by the master PHY processor 130, etc.). In an embodiment, the slave network interface device receives a training signal 184 of FIG. 1 or a training signal 210 of FIG. 2. In another embodiment, the slave network interface device receives a training signal different from the training signal 184 or a training signal 210. The training signal is for clock recovery and synchronization between the slave network interface device and the master network interface device, in an embodiment. In an embodiment, the training signal is transmitted by the master network interface device during a training phase of a link establishment procedure performed between the master network interface device and the slave network interface device. In an embodiment, for example, the training signal is an initial (e.g., a first) training signal among a plurality of training signals transmitted by the master network interface device during the training phase of the link establishment procedure.

At block 704, the slave network interface device determines, based on at least one physical characteristic of the training signal received at block 702, a physical layer (PHY) parameter of the master network interface device. For example, the slave network interface device determines, based on at least one physical characteristic of the training signal received at block 702, a transmission speed of the master network interface device. In other embodiments, the slave network interface device determines, based on at least one physical characteristic of the training signal received at block 702, a PHY operating parameter other than a transmission speed of the master network interface device. In various embodiments, the slave network interface device utilizes one or one or more of i) a continuity of the training signal, ii) an amplitude (e.g., peak-to-peak voltage) of the training signal, iii) a modulation of the training signal and iv) a fundamental frequency of the training signal to determine the PHY operating parameter of the master network interface device. In other embodiments, other suitable training signal physical characteristics are additionally or alternatively utilized to determine the PHY operating parameter of the master network interface device.

At block 706, a controller of the slave network interface device configures one or more PHY components of the slave network interface device to operate in a mode that corresponds to the determined PHY operating parameter of the master network interface device detected at block 704. For example, the controller of the slave network interface device configures one or more PHY components of the second network interface device to operate in a PHY mode that corresponds to the transmission speed of the master network interface device determined at block 704, in an embodiment. Detection of the PHY operating parameter of the master network interface device at the slave network device based on a training signal received during the training phase of link establishment between the master network interface device and the slave network interface device enables subsequent communication between the slave network interface device and the master network interface device without a need to pre-configure the slave network interface device for operation in a mode corresponding to the PHY operating parameter of the master network interface device and without performing a separate auto-negotiation of the PHY operating parameter between the slave network interface device and the master network interface device, in at least some embodiments.

In an embodiment, a method for establishing a communication link between a first network interface device and a second network interface device comprises: receiving, at the second network interface device, a training signal transmitted by the first network interface device, the training signal being for timing synchronization between the second network interface device and the first network interface device; determining, with the second network interface device based on at least one physical characteristic of the training signal, a physical layer (PHY) parameter of the first network interface device; and configuring, with a controller of the second network interface device, one or more components of the second network interface device to operate in a mode that corresponds to the determined PHY operating parameter of the first network interface device.

In other embodiments, the method also includes one of, or any suitable combination of two or more of, the following features.

Determining the PHY operating parameter of the first network interface device based on at least one physical characteristic of the training signal comprises: measuring a continuity of the training signal, and determining the PHY operating parameter based on the continuity of the training signal.

Determining the PHY operating parameter based on the continuity of the training signal comprises: sampling the training signal at a plurality of times corresponding to a time interval, counting a number of samples corresponding to periods of transmission in the training signal, and determining, based on the samples corresponding to periods of transmission in the training signal, that the training signal has a predetermined continuity characteristic specific to operation with a particular PHY operating parameter among a plurality of PHY operating parameters.

Determining the PHY operating parameter of the first network interface device based on at least one physical characteristic of the training signal comprises: measuring an amplitude of the training signal, and determining the PHY operating parameter based on the amplitude of the training signal.

Measuring the amplitude of the training signal comprises measuring a peak-to-peak voltage of the training signal.

Determining the PHY operating parameter of the first network interface device based on at least one physical characteristic of the training signal comprises determining the PHY operating parameter based on one of i) a modulation of the training signal and ii) a fundamental frequency of the training signal.

Determining the PHY operating parameter of the first network interface device based on at least one physical characteristic of the training signal comprises determining the PHY operating parameter based on a combination of two or more of i) a continuity of the training signal, ii) an amplitude of the training signal, iii) a fundamental frequency of the training signal and iv) a modulation of the training signal.

Determining the PHY operating parameter of the first network interface device comprises determining a transmission speed of the first network interface device.

Receiving the training signal comprises receiving an initial training signal of a training phase of establishing the communication link between the first network interface device and the second network interface device.

Determining the PHY operating parameter of the first network interface device comprises determining the PHY based on one or more samples obtained from the initial training signals.

The method further comprises recovering, with the second network interface device, a clock of the first network interface device from one or both i) the initial training signal and ii) one or more additional training signals received during the training phase of establishing the communication link between the first network interface device and the second network interface device.

In another embodiment, an apparatus comprises a second network interface device for coupling the apparatus with a first network interface device via a network link. The second network interface device comprises: a transceiver, implemented on one or more integrated circuit (IC) devices, configured to receive a training signal transmitted by the first network interface device over the network link, the training signal being for timing synchronization of the second network interface device with the first network interface device; a physical layer (PHY) operating parameter detector, implemented on the one or more IC devices, configured to determine, based on at least one physical characteristic of the training signal, a PHY operating parameter of the first network interface device; and a controller, implemented on the one or more IC devices, configured to configure one or more components of the second network interface device to operate in a mode that corresponds to the determined PHY operating parameter of the first network interface device.

In other embodiments, the apparatus also comprises one of, or any suitable combination of two or more of, the following features.

The PHY operating parameter detector is configured to: measure a continuity of the training signal, and determine the PHY operating parameter of the first network interface device based on the continuity of the training signal.

The PHY operating parameter detector is configured to: sample the training signal at a plurality of times corresponding to a time interval, count a number of samples corresponding to periods of transmission in the training signal, and determine, based on the number of samples corresponding to periods of transmission in the training signal, that the training signal has a continuity characteristic specific to operation with a particular PHY operating parameter among a plurality of PHY operating parameters.

The PHY operating parameter detector is configured to: measure an amplitude of the training signal, and determine the PHY operating parameter of the first network interface device based on the amplitude of the training signal.

The PHY operating parameter detector is configured to measure a peak-to-peak voltage of the training signal.

The PHY operating parameter detector is configured to determine the PHY operating parameter of the first network interface device based on one of i) a modulation of the training signal and ii) a fundamental frequency of the training signal.

The PHY operating parameter detector is configured to determine the PHY operating parameter of the first network interface device based on a combination of two or more of i) a continuity of the training signal, ii) an amplitude of the training signal, iii) a fundamental frequency of the training signal and iv) a modulation of the training signal.

The PHY operating parameter detector is configured to determine the PHY operating parameter of the first network interface device at least by determining a transmission speed of the first network interface device.

The transceiver is configured to receive an initial training signal of a training phase of establishing a communication link between the first network interface device and the second network interface device.

The PHY operating parameter detector is configured to determine the PHY operating parameter of the first network interface device based on one or more samples obtained from the initial training signals.

The second network interface device further comprises a clock recovery engine implemented on the one or more IC devices configured to recover a clock of the first network interface device from one or both i) the initial training signal and ii) one or more additional training signals received during the training phase of establishing the communication link between the first network interface device and the second network interface device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for establishing a communication link between a first network interface device and a second network interface device, the method comprising:
receiving, at the second network interface device, a training signal transmitted by the rust network interface device as part of establishing the communication link between the first network interface device and the second network interface device, the training signal being for timing synchronization between the second network interface device and the first network interface device;
determining, with the second network interface device based on at least one physical characteristic of the training signal, a physical layer (PHY) parameter of the first network interface device, the at least one physical characteristic of the training signal including one or more of i) a continuity of the training signal, ii) an amplitude of the training signal, iii) a fundamental frequency of the training signal and iv) a modulation of the training signal; and configuring, with a controller of the second network interface device, one or more components of the second network interface device to operate in a mode that corresponds to the determined PHY operating parameter of the first network interface device.

2. The method of claim 1, wherein determining the PHY operating parameter of the first network interface device based on at least one physical characteristic of the training signal comprises:

measuring the continuity of the training signal, and
determining the PHY operating parameter based on the continuity of the training signal.

3. The method of claim 2, wherein determining the PHY operating parameter based on the continuity of the training signal comprises:

sampling the training signal at a plurality of times corresponding to a time interval,
counting a number of samples corresponding to periods of transmission in the training signal, and
determining, based on the samples corresponding to periods of transmission in the training signal, that the training signal has a predetermined continuity characteristic specific to operation with a particular PHY operating parameter among a plurality of PHY operating parameters.

4. The method of claim 1, wherein determining the PHY operating parameter of the first network interface device based on at least one physical characteristic of the training signal comprises:

measuring the amplitude of the training signal, and
determining the PHY operating parameter based on the amplitude of the training signal.

5. The method of claim 4, wherein measuring the amplitude of the training signal comprises measuring a peak-to-peak voltage of the training signal.

6. The method of claim 1, wherein determining the PHY operating parameter of the first network interface device based on at least one physical characteristic of the training signal comprises determining the PHY operating parameter based on one of i) the modulation of the training signal and ii) the fundamental frequency of the training signal.

7. The method of claim 1, wherein determining the PHY operating parameter of the first network interface device based on at least one physical characteristic of the training signal comprises determining the PHY operating parameter based on a combination of two or more of i) the continuity of the training signal, ii) the amplitude of the training signal, iii) the fundamental frequency of the training signal and iv) the modulation of the training signal.

8. The method of claim 1, wherein determining the PHY operating parameter of the first network interface device comprises determining a transmission speed of the rust network interface device.

9. The method of claim 1, wherein:

receiving the training signal comprises receiving an initial training signal of a training phase of establishing the communication link between the first network interface device and the second network interface device, and determining the PHY operating parameter of the first network interface device comprises determining the PHY based on one or more samples obtained from the initial training signals.

10. The method of claim 9, further comprising recovering, with the second network interface device, a clock of the first network interface device from one or both i) the initial training signal and ii) one or more additional training signals received during the training phase of establishing the communication link between the first network interface device and the second network interface device.

11. The method of claim 1, wherein determining the PHY operating parameter of the first network interface device based on at least one physical characteristic of the training signal comprises:

measuring at least one of i) the continuity of the training signal, and ii) the amplitude of the training signal; and
determining the PHY operating parameter based on the at least one of i) the continuity of the training signal, and ii) the amplitude of the training signal.

12. An apparatus, comprising:

a second network interface device for coupling the apparatus with a first network interface device via a network link, the second network interface device comprising:

a transceiver, implemented on one or more integrated circuit (IC) devices, configured to receive a training signal transmitted by the first network interface device over the network link as part of establishing a communication link between the second network interface device and the first network interface device, the training signal being for timing synchronization of the second network interface device with the first network interface device, a physical layer (PHY) operating parameter detector, implemented on the one or more IC devices, configured to determine, based on at least one physical characteristic of the training signal, a PHY operating parameter of the first network interface device, the at least one physical characteristic of the training signal including one or more of i) a continuity of the training signal, ii) an amplitude of the training signal, iii) a fundamental frequency of the training signal and iv) a modulation of the training signal, and a controller, implemented on the one or more IC devices, configured to configure one or more components of the second network interface device to operate in a mode that corresponds to the determined PHY operating parameter of the first network interface device.

13. The apparatus of claim 12, wherein the PHY operating parameter detector is configured to:

measure at least one of i) the continuity of the training signal, and ii) the amplitude of the training signal; and
determine the PHY operating parameter based on the at least one of i) the continuity of the training signal, and ii) the amplitude of the training signal.

14. The apparatus of claim 12, wherein the PHY operating parameter detector is configured to:

measure the amplitude of the training signal, and
determine the PHY operating parameter of the first network interface device based on the amplitude of the training signal.

15. The apparatus of claim 14, wherein the PHY operating parameter detector is configured to measure a peak-to-peak voltage of the training signal.

16. The apparatus of claim 12, wherein the PHY operating parameter detector is configured to determine the PHY operating parameter of the first network interface device based on one of i) the modulation of the training signal and ii) the fundamental frequency of the training signal.

17. The apparatus of claim 12, wherein the PHY operating parameter detector is configured to determine the PHY operating parameter of the first network interface device based on a combination of two or mom of i) the continuity of the training signal, ii) the amplitude of the training signal, iii) the fundamental frequency of the training signal and iv) the modulation of the training signal.

18. The apparatus of claim 12, wherein the PHY operating parameter detector is configured to determine the PHY operating parameter of the first network interface device at least by determining a transmission speed of the first network interface device.

19. The apparatus of claim 12, wherein:
the transceiver is configured to receive an initial training signal of a training phase of establishing a communication link between the first network interface device and the second network interface device, and
the PHY operating parameter detector is configured to determine the PHY operating parameter of the first network interface device based on one or more samples obtained from the initial training signals.

20. The apparatus of claim 19, wherein the second network interface device further comprises a clock recovery engine implemented on the one or mom IC devices configured to recover a clock of the first network interface device from one or both i) the initial training signal and ii) one or mom additional training signals received during the training phase of establishing the communication link between the first network interface device and the second network interface device.

21. The apparatus of claim 12, wherein the PHY operating parameter detector is configured to:
measure the continuity of the training signal, and
determine the PHY operating parameter of the first network interface device based on the continuity of the training signal.

22. The apparatus of claim 21, wherein the PHY operating parameter detector is configured to:
sample the training signal at a plurality of times corresponding to a time interval,
count a number of samples corresponding to periods of transmission in the training signal, and
determine, based on the number of samples corresponding to periods of transmission in the training signal, that the training signal has a continuity characteristic specific to operation with a particular PHY operating parameter among a plurality of PHY operating parameters.

\* \* \* \* \*